J. STEPHENSON.

Car Axle-Box.

No. 8,085. Reissued Feb. 19, 1878.

*Fig. 2.* *Fig. 3.* *Fig. 4.*

*Witnesses:*

D. G. Stuart

A. W. Watkins

*Inventor:*

John Stephenson by S. Hannay atty.

N. PETERS, PHOTO-LITHOGRAPHER, WASHINGTON, D. C.

UNITED STATES PATENT OFFICE.

JOHN STEPHENSON, OF NEW YORK, N. Y.

IMPROVEMENT IN CAR-AXLE BOXES.

Specification forming part of Letters Patent No. 49,005, dated July 25, 1865; Reissue No. 8,085, dated February 19, 1878; application filed December 23, 1875.

DIVISION K².

*To all whom it may concern:*

Be it known that I, JOHN STEPHENSON, of New York, in the county of New York and State of New York, have invented certain new and useful Improvements in Car-Axle Boxes; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1:
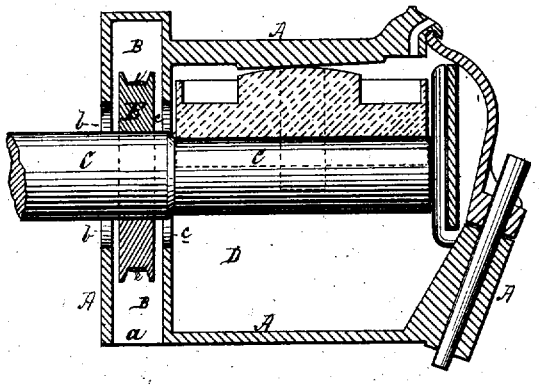
Figure 1:
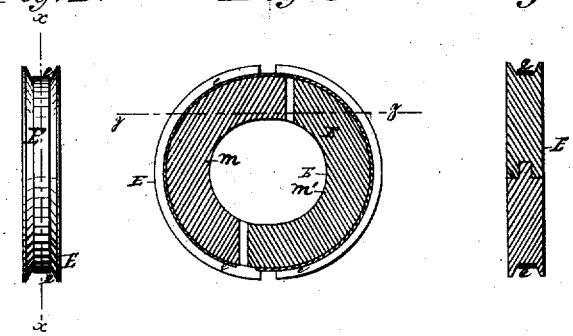

Figure 1 represents a vertical longitudinal section of a car-axle box to which my invention has been applied, the end of the axle being broken off, and shown in elevation. Fig. 2 represents a front view of the dust-collar and elastic ring detached from the box. Fig. 3 represents a circumferential vertical section of the same, taken through the line *x x* of Fig. 2; Fig. 4, a transverse section of the same, taken through the line *y y* of Fig. 3.

The object of this branch of my invention is to increase the durability of car-axles, and consequently to secure greater safety to passengers.

The bearings and journals of railroad-car axles wear most rapidly toward the shoulder, in consequence of the presence of foreign substances, which enter at the aperture through which the journal passes into the box. For this my invention provides a remedy. To this end I construct the axle-box shell with a dust-chamber at its rear end, and which is provided with an opening, which I prefer to have at the bottom. In this chamber I place a yielding or self-adjusting dust-collar, through which the axle-journals pass into the axle-box, the collar being made of a height or diameter greater than the openings of the box for the reception of the journal. Thus combined, the axle is capable of imparting to the collar both radial and rotary motion, the collar adjusting itself to every change of position of the axle-journal while griping and rotating with it.

To enable others skilled in the art to make, construct, and use my invention, I will now proceed to describe its parts in detail.

In the drawings, A indicates the axle-box, which, by reference to Fig. 1, it will be seen is provided with a chamber, B, having an opening, *a*, arranged therein, and which it is preferred to locate at the bottom of the chamber. *b* indicates the opening for the passage of the axle-journal through dust-chamber B, and *c* the corresponding opening into the axle-box chamber D. Through the opening *a* is inserted an elastic or self-adjusting dust-collar, E, into the chamber B. Through the opening in this collar is passed the end of the axle C, and thence into the box D proper. This dust-collar is so made as to fill, or nearly so, the space between the walls of the dust-chamber immediately surrounding the axle, but without crowding, so as to allow the collar to adjust itself to the movements of the axle, and to rotate therewith.

The dust-collar may be made in one, two, or more parts, and of metal or other suitable material.

When made of one piece, it may be constructed of an elastic substance, such as rubber, in which case it may be made in the form of a simple ring, of suitable size and shape; or it may be formed of an elastic metal ring cut or divided, so as to yield and give with a slip-joint, and at the same time fit the axle snugly. When made in two or more parts, I prefer to construct the parts of metal.

Such construction is shown in Figs. 3 and 4, where the collar is shown as being composed of two parts, *m m′*, the ends of which are fitted together by sliding joints—as, for instance, by tongue and groove—so as to form close joints. The periphery of the collar when thus made is provided with a groove to receive an elastic band or circular spring, by the compression of which upon the parts *m m′* their ends are forced together, and the parts *m m′* forming the collar clamped firmly to the axle, so as to fit it snugly, and act as a gate to exclude dust or other injurious foreign substance from the box.

The compressing girdle or spring should only have sufficient force to cause the collar to adhere to the axle with sufficient tenacity to be controlled by and turn with it, and otherwise be free to adjust itself to the movements of the axle-journal, whether in a vertical or lateral direction.

I do not confine myself to any particular mode of constructing the dust-collar, nor to any particular material out of which to make it, so long as it is made with slip-joints, and capable of turning with and being controlled by the axle-journal, as, from what has already been said, it will be apparant that it may be variously modified without departing from the principle of the invention; and so of the elastic ring which confines or clamps the parts of the collar together and to the axle, as such may be made of different kinds of materials, and also be variously modified in its construction; but I prefer the metallic dust-collar made in two parts, as described, and clamped together by an elastic steel band or strong india-rubber ring.

Having thus described my invention, I claim as new and desire to secure by Letters Patent—

1. A rotating and self-adjusting contractile dust-collar, in combination with an undivided car-axle box provided with a dust-chamber having an opening therein for the admission or withdrawal of the dust-collar, substantially as and for the purposes set forth.

2. A rotating and self-adjusting contractile dust-collar, in combination with an axle-journal and an undivided car-axle box provided with a dust-chamber having an opening therein, for the admission or withdrawal of the dust-collar, substantially as and for the purposes set forth.

3. A rotating and self-adjusting contractile dust-collar, in combination with an axle-journal unprovided at its outer end with a button or shoulder, and an undivided car-axle box provided with an opening therein, for the admission or withdrawal of the dust-collar, substantially as and for the purposes set forth.

In testimony that I claim the foregoing I have hereunto set my hand this 7th day of December, 1875.

JOHN STEPHENSON.

Witnesses:

STUART A. STEPHENSON,
WILLIAM J. WALKER.